United States Patent [19]

Ueda

[11] Patent Number: 5,261,028
[45] Date of Patent: Nov. 9, 1993

[54] CIRCUIT FOR DISCRIMINATING A GIVEN POINT WITHIN A PREDETERMINED AREA DEFINED BY TWO BOUNDARY VALUES

[75] Inventor: Tsuguo Ueda, Tokyo, Japan

[73] Assignee: NEC Corporation, Tokyo, Japan

[21] Appl. No.: 575,540

[22] Filed: Aug. 30, 1990

[30] Foreign Application Priority Data

Aug. 30, 1989 [JP] Japan ................................. 1-226074
Oct. 23, 1989 [JP] Japan ................................. 1-276858

[51] Int. Cl.$^5$ ............................................. G06F 15/62
[52] U.S. Cl. .................................... 395/119; 395/121
[58] Field of Search ...................... 395/129, 119–128

[56] References Cited

U.S. PATENT DOCUMENTS 4,758,965 7/1988 Liang et al. ........................ 395/129

Primary Examiner—Gary V. Harkcom
Assistant Examiner—Almis Jankus
Attorney, Agent, or Firm—Whitham & Marhoefer

[57] ABSTRACT

A circuit for discriminating whether or not a given point exists within a predetermined linear area, comprises first and second registers for storing first and second boundary values defining the predetermined linear area. A first detection circuit receives the first boundary value and a value of the given point, and a second detection circuit receives the second boundary value and the value of the given point. Each of the first and second detection circuits generating a first signal indicating that the boundary value is not greater than the value of the given point, a second signal indicating that the boundary value is equal to the value of the given point, and a third signal indicating that the boundary value is greater than the value of the given point. An output circuit receives the first, second and third signals from each of the first and second detection circuits, and generates an discrimination signal indicating that the value of given point is within the predetermined linear area defined by the first boundary value and the second boundary value.

12 Claims, 6 Drawing Sheets

CIRCUIT FOR DISCRIMINATING A GIVEN POINT WITHIN A PREDETERMINED AREA DEFINED BY TWO BOUNDARY VALUES

BACKGROUND OF THE INVENTION

1. Field of the Invention

The present invention relates to a comparison and calculation circuit for discriminating whether or not a given point exists within a predetermined linear area defined by a pair of boundary values, and more specifically, to a circuit for discriminating whether or not a given point exists within a predetermined area and for outputting a coordinate value of the given point in a new coordinate system having a lower limit point of the predetermined area as the origin of coordinate.

2. Description of Related Art

In the prior art, comparison and calculation for discriminating whether or not a given point exists for example within a predetermined linear or one-dimensional area have been performed in a software means, namely by executing a sequence of operation instructions. In this manner, two registers in a register group provided in a computer are assigned for presetting a pair of boundary values of the predetermined area, and a value of the given point is compared with a value stored in each of the registers. If it is judged that the value of the given point is larger than a lower boundary value of the present boundary value pair and smaller than an upper boundary value of the preset boundary value pair, it can be decided that the given point exists within the predetermined linear area.

For the above mentioned discrimination, however, the lower boundary value must be set in a register assigned for the lower boundary value and the upper boundary value must be set in another register assigned for the upper boundary value. Therefore, when a pair of boundary values are given, a large-and-small relation between the pair of given boundary values must be discriminated in advance so as to ensure that the lower boundary value is preset in a register assigned for the lower boundary value and the upper boundary value is preset in another register assigned for the upper boundary value.

In addition, if the number of areas to be discriminated increases, the execution time for required operation correspondingly increases, and finally, it becomes impossible to perform all the required operation within a given period of time.

SUMMARY OF THE INVENTION

Accordingly, it is an object of the present invention to provide an area discriminating circuit which has overcome the above mentioned defect of the conventional one.

Another object of the present invention is to provide an area discriminating circuit for executing required processings by means of hardware means so as to be capable of rapidly discriminating whether or not a given point exists within a predetermined linear area defined by a pair of boundary values.

A further object of the present invention is to provide an area discriminating circuit for rapidly discriminating whether or not a given point exists within a predetermined linear area by presetting a pair of boundary values to a pair of boundary value registers without consideration of a large-and-small relation between the given pair of boundary values.

The above and other objects of the present invention are achieved in accordance with the present invention by a circuit for discriminating whether or not a given point exists within a predetermined linear area, comprising;

first and second registers for storing first and second boundary values defining the predetermined linear area;

first detection means receiving the first boundary value and a value of the given point, for generating a first signal indicating that the first boundary value is not greater than the value of the given point, a second signal indicating that the first boundary value is equal to the value of the given point, and a third signal indicating that the first boundary value is greater than the value of the given point;

second detection means receiving the second boundary value and the value of the given point, for generating a fourth signal indicating that the second boundary value is not greater than the value of the given point, a fifth signal indicating that the second boundary value is equal to the value of the given point, and a sixth signal indicating that the second boundary value is greater than the value of the given point;

first logic means receiving the first, fifth and sixth signals for generating a seventh signal indicating that the value of given point is not less than the first boundary value and is not greater than the second boundary value;

second logic means receiving the second, third and fourth signals for generating an eighth signal indicating that the value of given point is not less than the second boundary value and is not greater than the first boundary value; and output means receiving the seventh and eighth signals for generating a discrimination signal indicating that the value of the given point is within the predetermined linear area defined by the first boundary value and the second boundary value.

The above and other objects, features and advantages of the present invention will be apparent from the following description of preferred embodiments of the invention with reference to the accompanying drawings.

DESCRIPTION OF THE PREFERRED EMBODIMENTS

Figure 1:
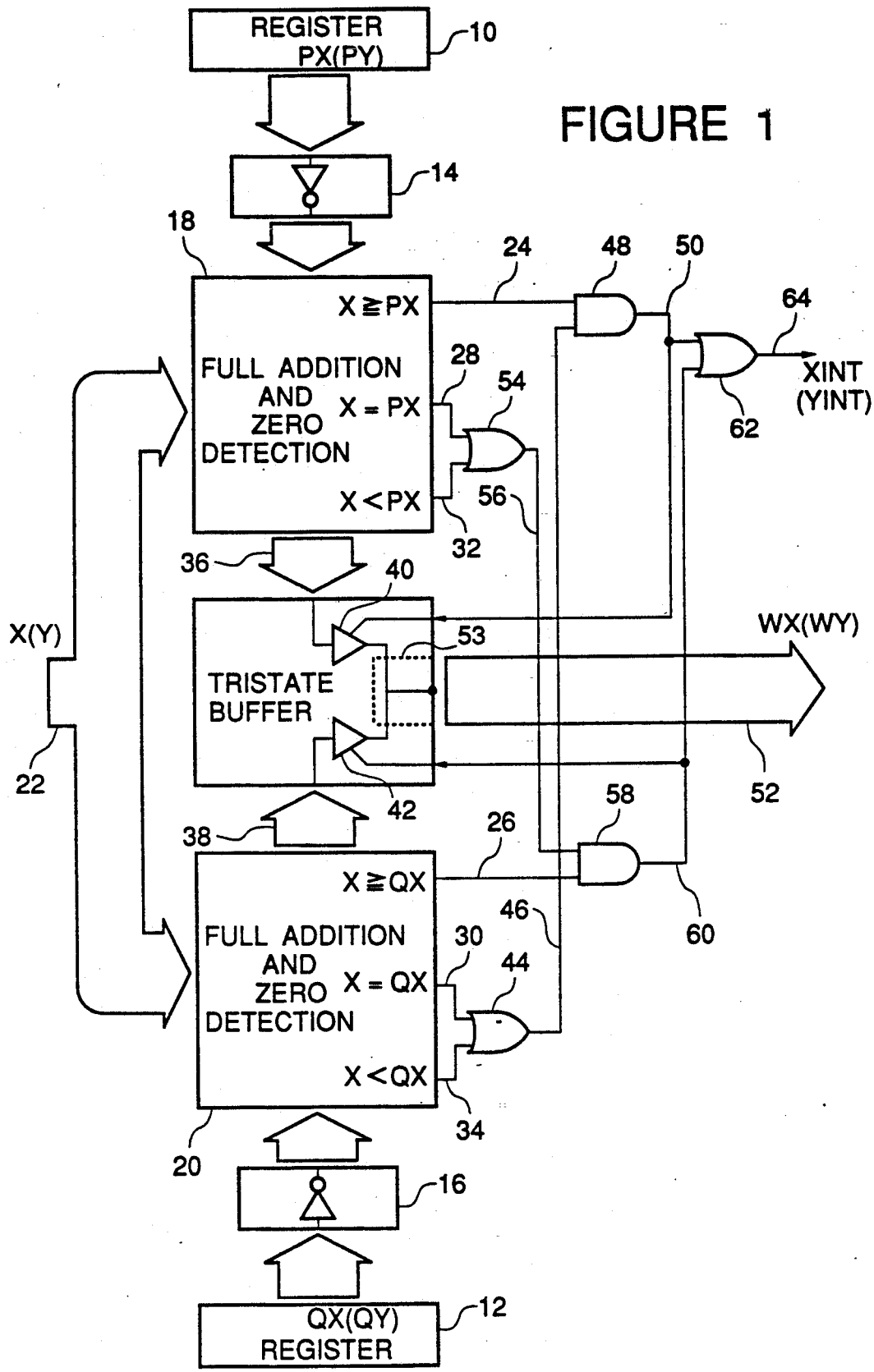
FIG. 1 is a block diagram of an embodiment of the linear area discriminating circuit in accordance with the present invention.

Referring to FIG. 1, there is shown a block diagram of an embodiment of a linear or one-dimensional area discriminating circuit in accordance with the present invention.

The shown linear area discriminating circuit includes a pair of registers 10 and 12 for respectively storing a pair of boundary values PX and QX which define a predetermined or one-dimensional linear area. Here, the boundary values PX and QX are not less than 0 (zero), namely, not a minus value. The boundary values PX and QX (or PY and QY) can be preset to the pair of registers 10 and 12 without consideration of a large-and-small relation. Therefore, an upper boundary value may be preset to the register 10 and a lower boundary value may be preset to the register 12, or the upper boundary value may be preset to the register 12 and the lower boundary value may be preset to the register 10.

Each of the boundary values preset in the registers 10 and 12 is connected to a corresponding inverting circuit 14 or 16 for inverting each of the bits of each boundary value, so that the boundary value is converted into a one's complement. Each of the one's complements thus obtained is supplied as an addend to a corresponding full addition and zero detection circuit 18 or 20.

On the other hand, a value X(or Y) for a given point is supplied as an augend through an input 22 to both of the full addition and zero detection circuits 18 and 20.

The full addition and zero detection circuits 18 and 20 are such that "1" is added as a carry signal to a carry input of a unitary full adder for a LSB (least significant bit), so that a two's complement is added as the addend. Each of the full addition and zero detection circuits 18 and 20 generates a first signal 24 or 26 indicating that the addend is not greater than the augend, a second signal 28 or 30 indicating that the addend is equal to the augend, and a third signal 32 or 34 indicating that the addend is greater than the augend.

An result of addition 36 or 38 of each full addition and zero detection circuits 18 or 20 is inputted to a corresponding tristate buffer 40 or 42. The results of addition 36 and 38 indicate a sum of the given point value X and the two's complement of one preset boundary value PX and a sum of the given point value X and the two's complement of another preset boundary value QX, respectively.

If the given point value X is between one preset boundary value PX and another preset boundary value QX, and if $PX \leq QX$, (namely, when $PX \leq X \leq QX$), the result of addition 36 indicates a coordinate value of the given point X in a coordinate system converted to have the lower boundary value PX as the origin of coordinate. Therefore, the third signal 34 indicative of $X<QX$ and the second signal 30 indicative of $X=QX$ generated in the full addition and zero detection circuit 20 are connected to an OR gate 44, which outputs a logical sum signal 46 to one input of an AND gate 48. The other input of AND gate 48 is connected to receive the first signal 24 indicative of $X \geq PX$ generated in the full addition and zero detection circuit 18. Therefore, the AND gate 48 generates a logical product signal 50 indicative of $PX \leq X \leq QX$. This logical product signal 50 indicative of $PX \leq X \leq QX$ is supplied as a control signal to the tristate buffer 40, so that the result of addition 36 is outputted as an output signal WX (or WY) 52 through the tristate buffer 40.

On the other hand, if the given point value X is between the preset boundary values PX and QX, and if $PX \geq QX$, (namely, when $PX \geq X \geq QX$), the result of addition 38 indicates a coordinate value of the given point X in a coordinate system converted to have the lower boundary value QX as the origin of coordinate. Therefore, the third signal 32 indicative of $X<PX$ and the second signal 28 indicative of $X=PX$ generated in the full addition and zero detection circuit 18 are connected to an OR gate 54, which outputs a logical sum signal 56 to one input of an AND gate 58. The other input of AND gate 58 is connected to receive the first signal 26 indicative of $X \geq QX$ generated in the full addition and zero detection circuit 20. Therefore, the AND gate 58 generates a logical product signal 60 indicative of $PX \geq X \geq QX$. This logical product signal 60 indicative of $PX \geq X \geq QX$ is supplied as a control signal to the tristate buffer 42, so that the result of addition 38 is outputted as the output signal WX (or WY) 52 through the tristate buffer 42.

The outputs of the two tristate buffers 40 and 42 are connected in such a manner that each pair of the same place bit or corresponding bits of the outputs of the two tristate buffers 40 and 42 are connected to form a wired OR 53.

As mentioned above, the logical product signal 50 indicates that the given point X is between the pair of boundary values PX and QX in the case of $PX \leq QX$, and the logical product signal 60 indicates that the given point X is between the pair of boundary values PX and QX in the case of $QX \leq PX$. Therefore, the logical product signals 50 and 60 are supplied to an OR gate 62, so that the OR gate 62 generates a logical sum signal 64 indicating that the given point X is between the pair of boundary values PX and QX, regardless of which of the pair of boundary values PX and QX is a lower (or upper) boundary value.

Thus, the signal 64 indicates the result of discrimination on whether or not a given point exists within a predetermined linear area, and the output 52 gives a coordinate value of the given point in a new coordinate system having the lower boundary value of the predetermined linear area as the origin of coordinate.

Figure 2:
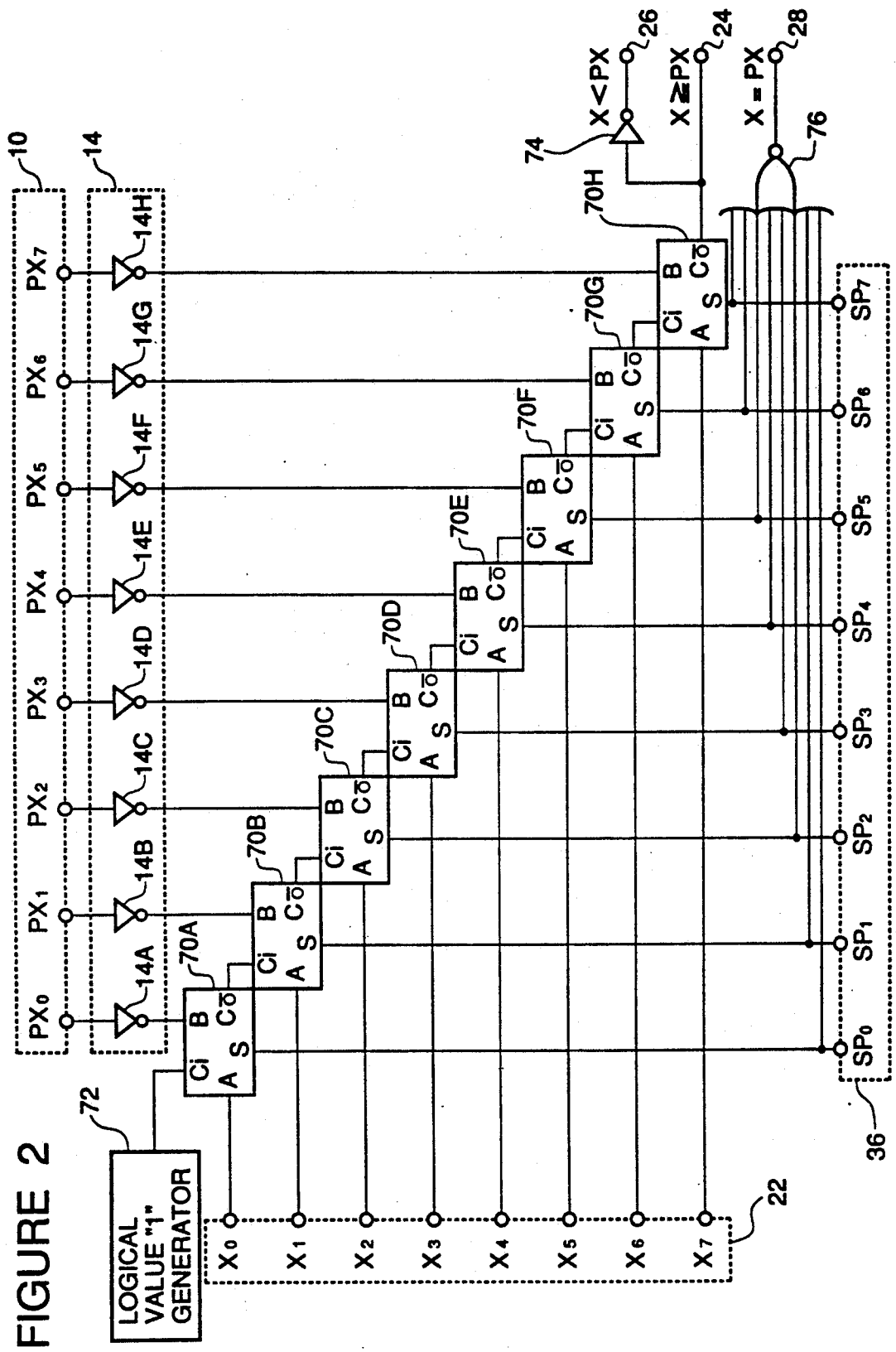
FIG. 2 is a logic circuit diagram of the full addition and zero detection circuit used in the linear area discriminating circuit shown in FIG. 1.

Referring to FIG. 2, there is shown a logic circuit diagram of the full addition and zero detection circuit used in the linear area discriminating circuit 18 shown in FIG. 1, in which each data is composed of 8 bits. Although only the linear area discriminating circuit 18 is shown in FIG. 2, the linear area discriminating circuit 20 has the same construction as the linear area discriminating circuit 18, and the only difference is that the supplied addend is different.

The linear area discriminating circuit 18 includes eight full adders 70A to 70H, each of which has a first input A connected to a corresponding bit $X_0$ to $X_7$ of the given point value X, and a second input B connected to receive a corresponding bit $PX_0$ to $PX_7$ of the boundary value PX preset in the register 10, through a corresponding inverter 14A to 14H of the inverting circuit 14. The full adder 70A for the LSB bit has a carry input Ci connected to receive a signal of a binary value "1" generated in a logical value "1" generator 72. Each of the full adders 70A to 70G excluding the full adder 70H for a MSB (most significant bit) has a carry output Co connected to a carry input Ci of a next significant bit full adder. Sum outputs S of all the full adders 70A to 70H are connected to binary outputs $SP_0$ to $SP_7$ of the output 36 connected to an input of the corresponding tristate buffer 40.

With the above arrangement, when the given point value X is equal to or larger than the boundary value PX, the binary outputs $SP_0$ to $SP_7$ indicate a difference between the given point value X and the boundary value PX, namely, a coordinate value of the given point X in a coordinate system converted to have the boundary value PX as the origin of coordinate.

The carry output Co of the MSB bit full adder 70H is activated when the given point value X is equal to or larger than the boundary value PX, and therefore, gives the first signal 24 indicative of X>PX. Therefore, the carry output Co of the MSB bit full adder 70H is supplied to an inverter 74, so that the inverter 74 generates the third signal 26 indicative of X<PX. In addition, the sum outputs S of all the full adders 70A to 70H are made inactive when the given point value X is equal to the boundary value PX. Therefore, the sum outputs S of all the full adders 70A to 70H are connected to an eight-input NOR gate 76, so that the NOR gate 76 generates the active second signal indicative of X=PX.

Figure 3:
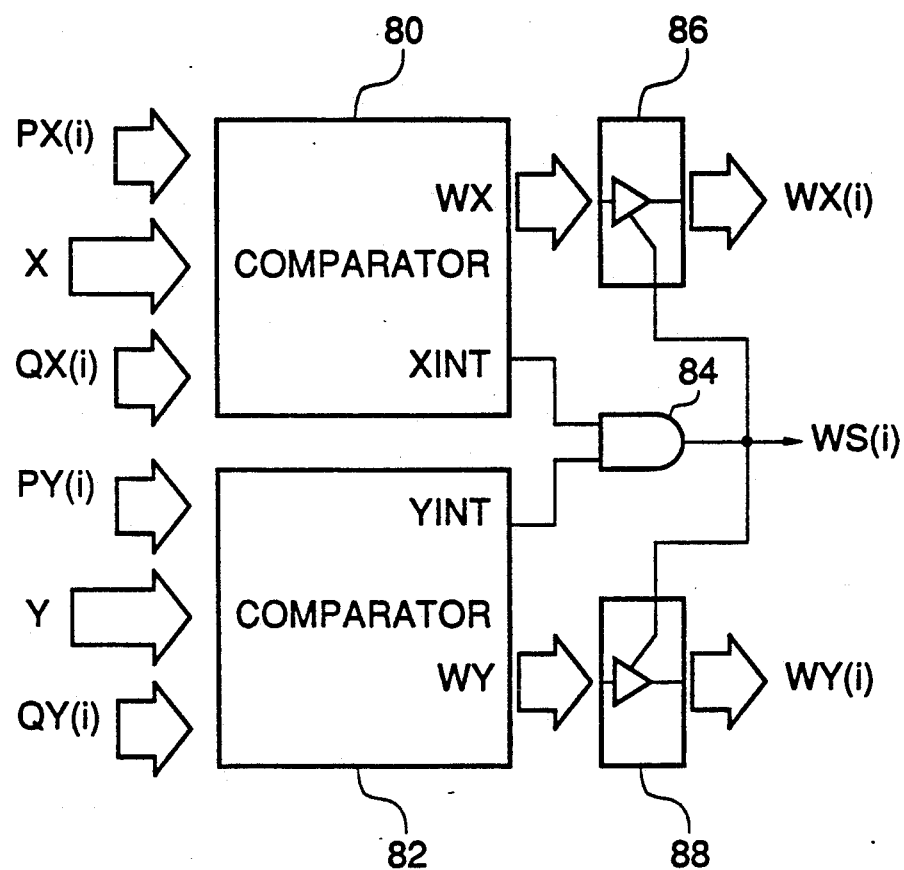
FIG. 3 is a block diagram of an embodiment of a rectangular area discriminating circuit using the linear area discriminating circuit in accordance with the present invention.

Turning to FIG. 3, there is shown an embodiment of a rectangular two-dimensional area discriminating circuit using the linear area discriminating circuit shown in FIG. 1. The shown circuit includes a pair of comparators 80 and 82, each of which has the same construction as that of the linear area discriminating circuit shown in FIG. 1.

One of the comparators 80 is connected to receive a value X of a given point in one coordinate axis of a two-dimensional coordinate system, for example, in an X-axis of a rectangular Cartesian coordinate system, and a pair of boundary values PX(i) and QX(i) in the X-axis of the same coordinate system. The comparator 80 generates a signal XINT indicating that the X-axis value X of the given point is between the pair of boundary values PX(i) and QX(i), and another signal WX indicating a coordinate value of the given point in a new coordinate system having as the origin of coordinate a low boundary value of the pair of boundary values PX(i) and QX(i). The signal XINT is supplied to one input of an AND gate 84, and the signal WX is outputted through a tristate buffer 86 as a signal WX(i) when the tristate buffer 86 is active.

On the other hand, the other comparator 82 is connected to receive a value Y of the given point in the other coordinate axis of the same two-dimensional coordinate system, for example, in a Y-axis of the rectangular Cartesian coordinate system, and a pair of boundary values PY(i) and QY(i) in the Y-axis of the same coordinate system. The comparator 82 generates a signal YINT indicating that the Y-axis value Y of the given point is between the pair of boundary values PY(i) and QY(i), and another signal WY indicating a coordinate value of the given point in a new coordinate system having as the origin of coordinate a low boundary value of the pair of boundary values PY(i) and QY(i). The signal YINT is supplied to the other input of the AND gate 84, and the signal WY is outputted through a tristate buffer 88 as a signal WY(i) when the tristate buffer 88 is active.

In addition, an output of the AND gate 84 is supplied as a control signal to both the tristate buffers 86 and 88.

As will seen from the above description, the output of the AND gate 84 gives a signal WS(i) activated only when the X-axis value X of the given point is between the pair of boundary values PX(i) and QX(i), and at the same time the Y-axis value Y of the given point is between the pair of boundary values PY(i) and QY(i). Namely, the signal WS(i) indicates whether or not the given point exists within an predetermined two-dimensional area defined by the boundary values PX(i), QX(i), PY(i) and QY(i). When the signal WS(i) is activated, the two tristate buffers 86 and 88 are brought into an opened or conductive condition, so that the signals WX and WY are outputted through the tristate buffers 86 and 88 as the signals WX(i) and WY(i), which indicate a coordinate value of the given point in a new coordinate system having the origin of coordinate which is defined by a lower X value of the boundary values PX(i) and QX(i), and a lower Y value of the boundary values PY(i) and QX(i), namely, which is the nearest to the origin of coordinate in the original coordinate system.

Figure 4:
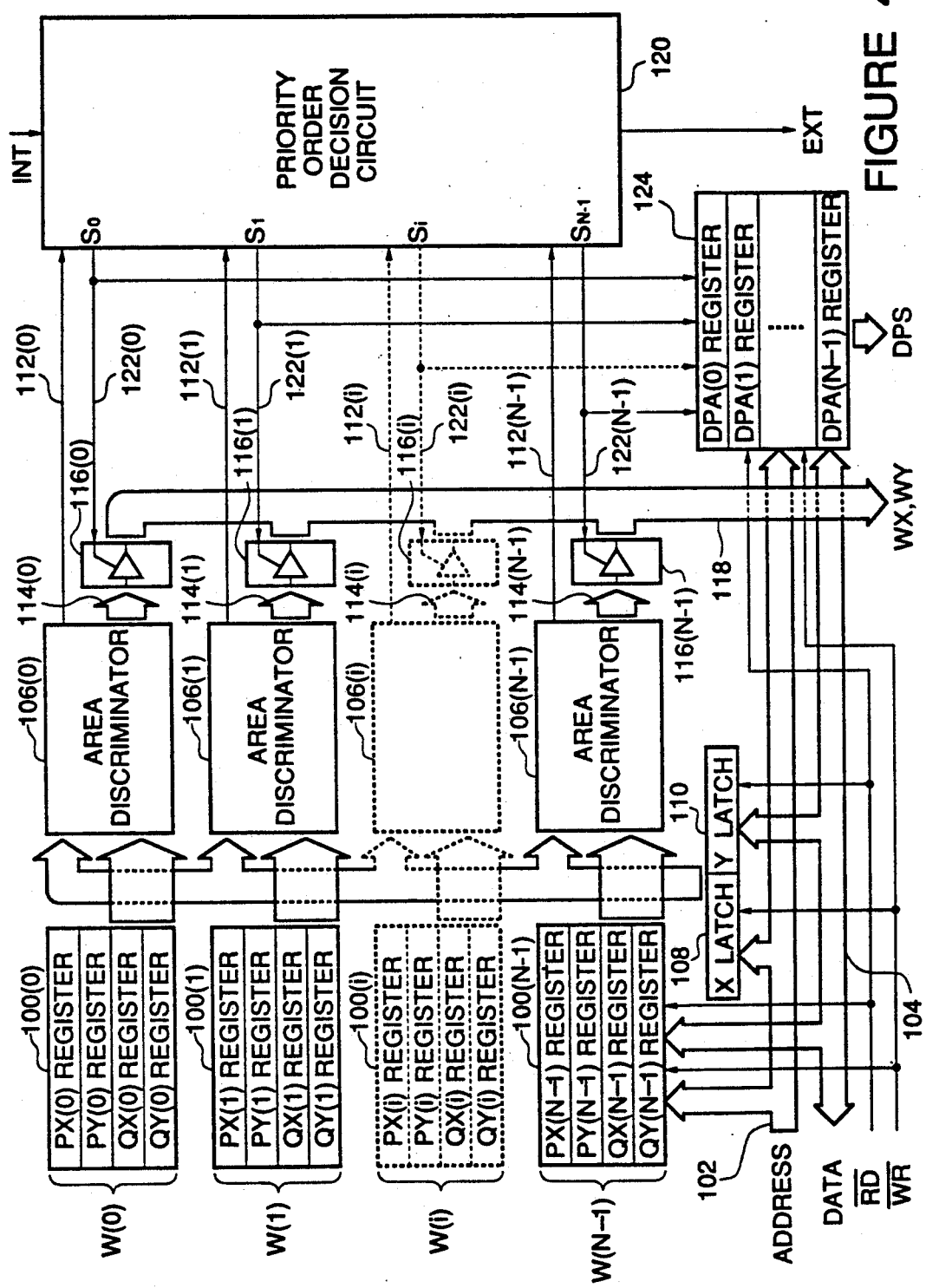
FIG. 4 is a block diagram of another embodiment of the rectangular two-dimensional area discriminating circuit using the linear area discriminating circuit shown in FIG. 1.

This type of processing for discriminating whether or not a given point exists within a given rectangular two-dimensional area is typically utilized in a so called multi-window processing. Referring to FIG. 4, there is shown another embodiment of a rectangular two-dimensional area discriminating circuit using the linear area discriminating circuit shown in FIG. 1.

The shown circuit includes a plurality of rectangular two-dimensional area designation registers 100(0), 100(1), ..., 100(i), ..., 100(N−1) each coupled to an address bus 102 and a data bus 104 and controlled by a read signal $\overline{RD}$ and a write signal $\overline{WR}$. Each of the area designation registers 100(0), 100(1), ..., 100(i), ..., 100(N−1) stores four coordinate values PX(i), PY(i), QX(i) and QY(i) defining a pair of orthogonal corner points of a given rectangular area within the rectangular Cartesian coordinate system (X-Y coordinate system). The area designation registers 100(0), 100(1), ..., 100(i), ..., 100(N−1) are coupled to the same number of area discriminators 106(0), 106(1), ..., 106(i), ..., 106(N−1), respectively. The area discriminators 106(0), 106(1), ..., 106(i), ..., 106(N−1) are also coupled to an X latch 108 and a Y latch 110, which are in turn coupled to the data bus 104 so as to latch and output a X value and an Y value of a given point R, respectively, under control of the read signal $\overline{RD}$ and the write signal $\overline{WR}$.

Each of the area discriminators 106(0), 106(1), ..., 106(i), ..., 106(N−1) generates a discrimination signal 112(0), 112(1), ..., 112(i), ..., or 112(N−1), indicating whether or not the given point R is within a predetermined rectangular area defined by the boundary values PX(i), PY(i), QX(i) and QY(i) preset in the corresponding area designation register 100(0), 100(1), ..., 100(i), ..., or 100(N−1). In addition, each of the area discriminators 106(0), 106(1), ... 106(i), ..., 106(N−1) also generates data 114(0), 114(1), ..., 114(i), ..., or 114(N−1), giving a coordinate value of the given point in a coordinate system having as the origin of coordinate a lower boundary point of the given rectangular area nearest to the origin of coordinate in the original coordinate system.

Each of the data 114(0), 114(1), ..., 114(i), ..., and 114(N−1) is outputted through a tristate buffer 116(0), 116(1), ..., 116(i), ..., or 116(N−1) to an output bus 118, which supplies a coordinate-converted data (WX, WY).

The discrimination signals 112(0), 112(1), ..., 112(i), ..., and 112(N−1) are supplied to a priority order decision circuit 120, which generates priority signals 122(0), 122(1), ..., 122(i), ..., and 122(N−1) to the corresponding tristate buffers 116(0), 116(1), ..., 116(i), ..., and 116(N−1), respectively. The priority signals 122(0), 122(1), ..., 122(i), ..., and 122(N−1) are also supplied to an address hold register 124 of a memory bank. This address hold register 124 is also coupled to the address bus 102 and the data bus 104 and controlled by the read signal $\overline{RD}$ and the write signal $\overline{WR}$.

The priority order decision circuit 120 gives the priority orders or numbers "0" to "N−1" to given rectangular areas defined by the area designation registers 100. When a plurality of discrimination signals 112 are activated at the same time, the priority order decision circuit 120 preferentially select a discrimination signal for a rectangular area having the smallest number (highest priority order) among the rectangular areas corresponding to the active discrimination signals 112, and outputs an active priority signal to the tristate buffer corresponding to the rectangular area having the smallest number, so that the data 114 corresponding to the active discrimination signal having the smallest number is outputted as the data (WX, WY).

In order to expand the number of rectangular areas, the rectangular priority order decision circuit 120 receives an allowance signal INT allowing to output the priority signal 122(0), 122(1), ..., 122(i), ..., or 122(N−1), and generates an out-of-area signal EXT when none of the discrimination signals 112(0), 112(1), ..., 112(i), ..., and 112(N−1) is activated.

The address hold register 124 stores area data memory block addresses DPA(0), ..., and DPA(N−1) each designating a memory block which stores a rectangular area display data corresponding to each rectangular area. In response to the active priority signal 122(0), 122(1), ..., 122(i), ..., or 122(N−1), a register corresponding to the rectangular area corresponding to the active priority signal is selected, and the area data memory block address stored in the selected register is outputted as an area data memory block address DPC.

Figure 5:
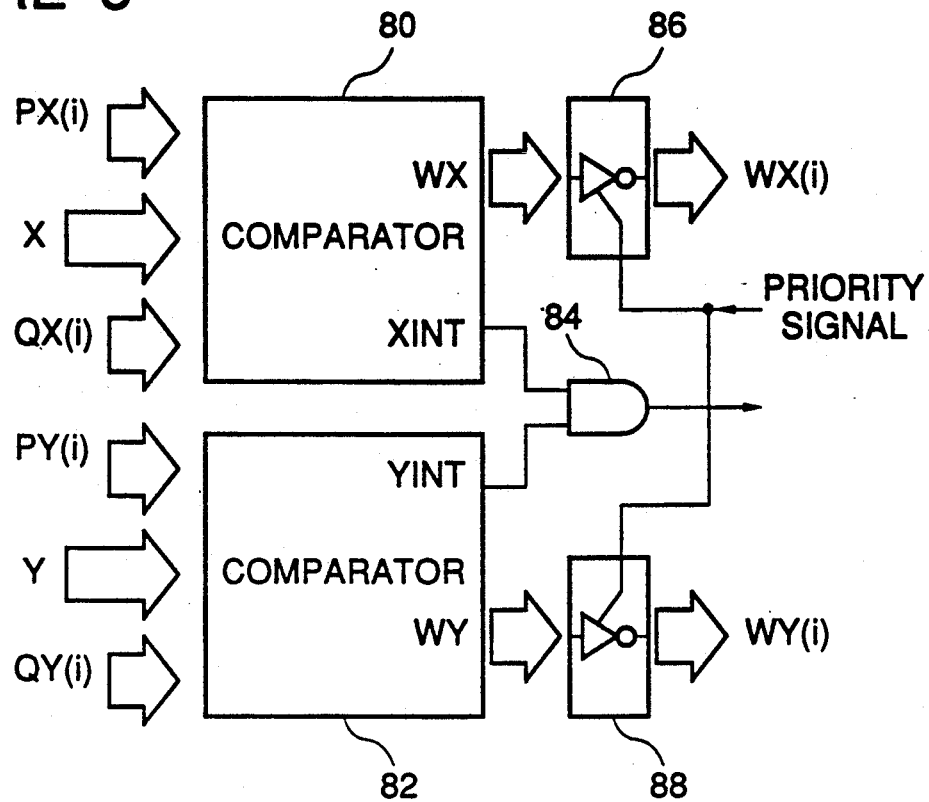
FIG. 5 is a block diagram of the area discriminator used in the rectangular two-dimensional area discriminating circuit shown in FIG. 4.

Each of the area discriminators 106(0), 106(1), ..., 106(i), ..., and 106(N−1) are constructed as shown in FIG. 5. Each area discriminator shown in FIG. 5 is very similar to the case shown in FIG. 3, and therefore, the same Reference Numerals are given. In the area discriminator shown in FIG. 5, each of the tristate buffers is controlled by the priority signal 122(i) from the priority order decision circuit 120, not by the discrimination signal outputted from the AND gate 84.

Figure 6:
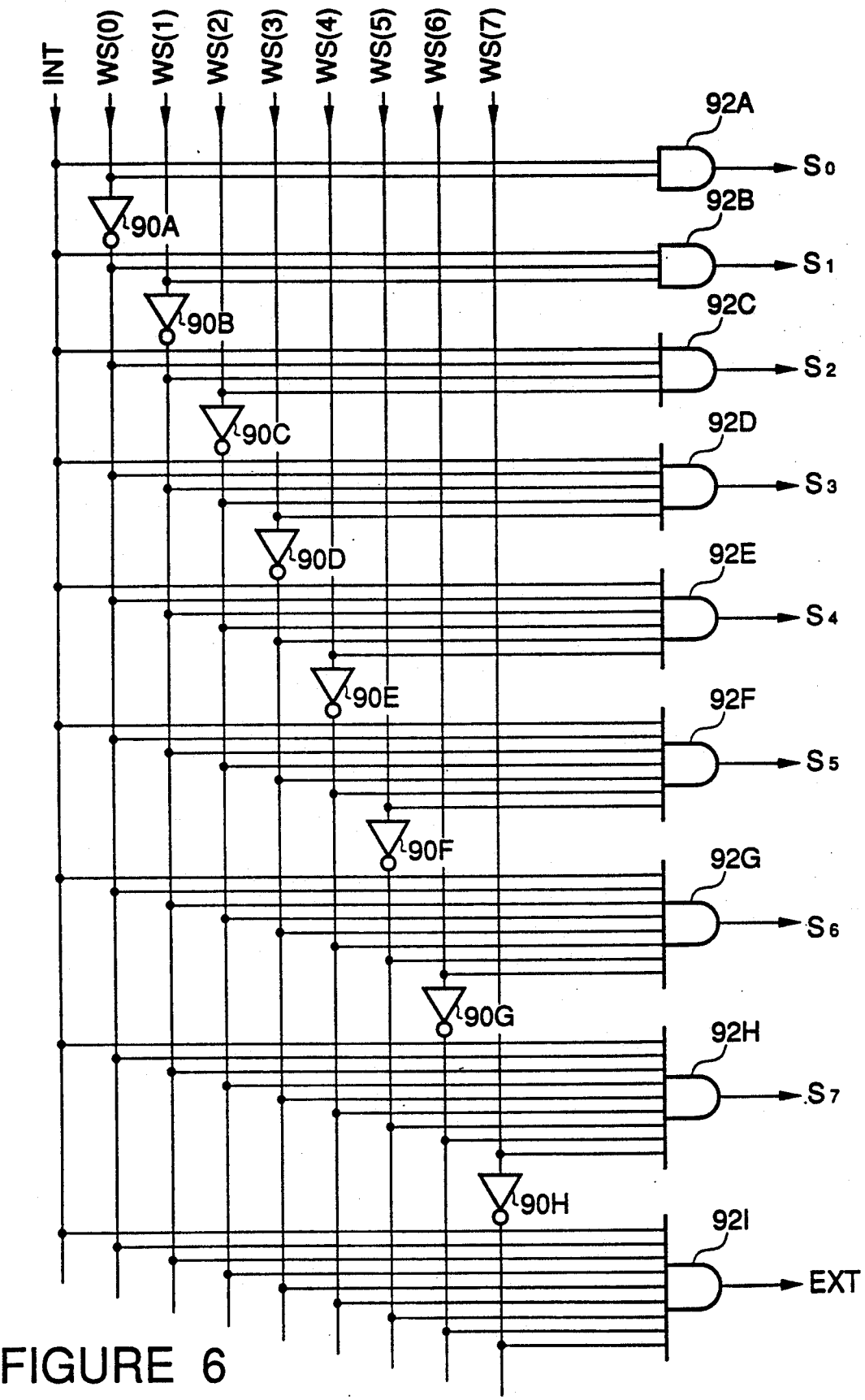
FIG. 6 is a logic circuit diagram of the priority order decision circuit used in the rectangular two-dimensional area discriminating circuit shown in FIG. 4 in the case of eight reference areas being given.

Referring to FIG. 6, there is shown a logic circuit diagram of the priority order decision circuit 120 in the case of eight reference areas being given. The priority order decision circuit 120 includes eight invertors 90A to 90H receiving the discrimination signals WS(0) to WS(7), respectively. The priority order decision circuit 120 also includes nine AND gates 92A to 92I each receiving the allowance signal INT. Each of the AND gates 92A to 92I also receives the corresponding discrimination signal and outputs of all the invertors having a priority number or order smaller than that of the corresponding discrimination signal, as shown in FIG. 6. Thus, it would be understood from FIG. 6 that when two or more of the discrimination signals WS(0) to WS(7) are activated at the same time, the priority order decision circuit 120 preferentially selects a discrimination signal for a rectangular area having the smallest priority number, and outputs an active priority signal $S_0$ to $S_7$ corresponding to the selected discrimination signal. In addition, when none of the discrimination signals WS(0) to WS(7) is activated, the AND gate 92I generates the out-of-area signal EXT.

Figure 7:
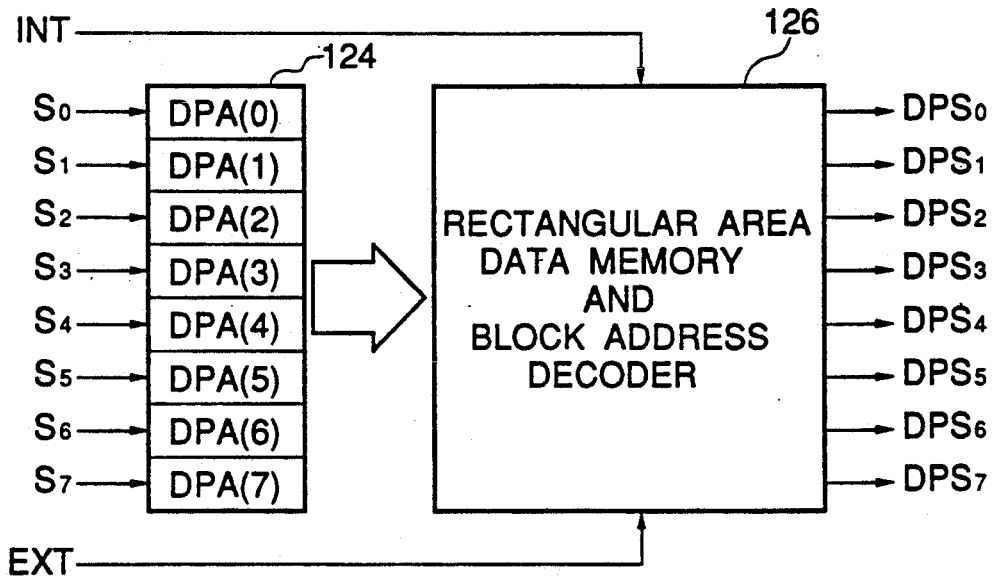
FIG. 7 is a block diagram of the address hold register and an associated address decoder, in the case of eight reference areas being given.

FIG. 7 shows a block diagram of the address hold register 124 and an associated address decoder, in the case of eight reference areas being given. As mentioned above, the address hold register 124 stores the area data memory block addresses DPA(0) to DPA(7) each designating a memory block which stores a rectangular area display data corresponding to each rectangular area. In response to the active priority signal S, a register corresponding to the rectangular area corresponding to the active priority signal is selected, and the area data memory block address stored in the selected register is outputted to a memory block address decoder 126, where the address is decoded. Thus, there can be obtained a perfect address storing the data corresponding to the given point R (WX, WY) within the rectangular area.

In the case of a multi-window calculation operation, for example, assume that two window areas $A_1$ and $A_2$ are given. First, corresponding data of the window area $A_1$ is preset to a corresponding register W(i) of the area designation register 100 and a corresponding register DPA(i) of the address hold register 124, respectively, and corresponding data of the window area $A_2$ is preset to corresponding registers W(j) and DPA(j) of the area designation register 100 and the address hold register 124, respectively. Here, assume i<j. In addition, respective display data of the window areas $A_1$ and $A_2$ are stored in memory blocks $B_1$ and $B_2$ designated by memory block addresses preset in the registers DPA(i) and DPA(j). In this case, if the window areas $A_1$ and $A_2$ partially overlaps to each other, the window area $A_1$ is preferentially selected.

On the other hand, if corresponding data of the window area $A_2$ is preset to corresponding registers W(i) and DPA(i), and corresponding data of the window area $A_1$ is preset to corresponding registers W(j) and DPA(j), and if the data stored in the memory blocks $B_1$ and $B_2$ is maintained without modification, when the window areas $A_1$ and $A_2$ partially overlaps to each other, the window area $A_2$ is preferentially selected.

With this feature, the priority order can be easily changed by only changing the content of the area designation register 100 and the address hold register 124, without modifying the display data stored in the memory blocks $B_1$ and $B_2$. In addition, it is possible to reduce, enlarge and move the rectangular areas by only changing the area designation register 100.

As seen from the above description, the area discriminating circuit in accordance with the present invention has the comparison and calculation means realized in a hardware manner in place of a software manner. Therefore, an operation time required for comparison and calculation can be greatly reduced. In addition, even if the number of areas to be discriminated increases, it is possible to restrain or suppress increase of the operation time by arranging the required hardware means in parallel.

In addition, the area discriminating circuit in accordance with the present invention has a pair of full addition and zero detection circuits each discriminating (1) whether or not a boundary value is not greater than a value of a given point, (2) whether or not the boundary value is equal to the value of the given point, and (3) whether or not a boundary value is greater than the value of the given point. With this feature, a pair of given boundary values for defining a predetermined area can be preset to registers without paying attention to a large-and-small relation between the given boundary values, namely without discriminating an upper boundary value and a lower boundary value of the given boundary values.

The invention has thus been shown and described with reference to the specific embodiments. However, it should be noted that the present invention is in no way limited to the details of the illustrated structures but changes and modifications may be made within the scope of the appended claims.

I claim:

1. A circuit for discriminating whether or not a given point exists within predetermined linear boundaries, comprising:

first and second registers for storing first and second numbers representing boundary values defining the predetermined linear boundaries;

first detection means receiving said first number from said first register and an input number representing a coordinate value of the given point, for generating a first signal indicating that said first boundary value is not greater than said coordinate value of the given point, a second signal indicating that said first boundary value is equal to said coordinate value of the given point, and a third signal indicating that said first boundary value is greater than said coordinate value of the given point;

second detection means receiving said second number from said first register and said input number representing the coordinate value of the given point, for generating a fourth signal indicating that said second boundary value is not greater than said coordinate value of the given point, a fifth signal indicating that said second boundary value is equal to said coordinate value of the given point, and a sixth signal indicating that said second boundary value is greater than said coordinate value of the given point;

first logic circuit means receiving said first, fifth and sixth signals for generating a seventh signal indicating that said coordinate value of the given point is not less than said first boundary value and is not grater than said second boundary value;

second logic circuit means receiving said second, third and fourth signals for generating an eighth signal indicating that said coordinate value of the given point is not less than said second boundary value and is not greater than said first boundary value; and output means receiving said seventh and eighth signals for generating a discrimination signal indicating that said coordinate value of the given point is within the predetermined linear boundaries defined by said first boundary value and said second boundary value.

2. An area discriminating circuit claimed in claim 1 wherein said first logic circuit means includes a first OR gate receiving said fifth and sixth signals, and a first AND gate receiving said first signal and an output of said first OR gate so as to generate said seventh signal indicating that said coordinate value of the given point is not less than said first boundary value and is not greater than a said second boundary value, and said second logic circuit means includes a second OR gate receiving said second and third signals, and a second AND gate receiving said fourth signal and an output of said second OR gate so as to generate said eighth signal indicating that said coordinate value of the given point is not less than said second boundary value and is not greater than said first boundary value.

3. An area discriminating circuit claimed in claim 2 wherein said output means includes a third OR gate receiving outputs of said first and second AND gates so as to generate said discrimination signal indicating that said coordinate value of the given point is within the predetermined linear boundaries defined by said first boundary value and said second boundary value.

4. An area discriminating circuit claimed in claim 1 wherein said first detection means includes a first inversion means receiving said first number for generating a two's complement of said first number, and a first addition and zero detection means receiving said two's complement of said first number and said coordinate value of the given point, said first addition and zero detection means generating said first signal, said second signal and said third signal, and wherein said second detection means includes a second inversion means receiving said second number for generating a two's complement of said second number, and a second addition and zero detection means receiving said two's complement of said second number and said coordinate value of the given point, said second addition and zero detection means generating said fourth signal, said fifth signal and said sixth signal.

5. An area discriminating circuit claimed in claim 1 wherein said first detection means outputs a first difference signal between said first number and said input number representing the coordinate value of the given point, and said second detection means outputs a second difference signal between said second number and said input number representing the coordinate value of the given point, and further including:

a first tristate buffer means receiving a first difference signal and controlled by said seventh signal so that said first difference signal is outputted from said first tristate buffer means when said coordinate value of the given point is not less than said first boundary value and is not greater than said second boundary value, a second tristate buffer means receiving a second difference signal and controlled by said eighth signal so that said second difference signal is outputted from said second tristate buffer means when said coordinate value of the given point is not less than said second boundary value and is not greater than said first boundary value, and an OR output means receiving an output of said first tristate buffer means and an output of said second tristate buffer means so as to generate an output signal indicating a coordinate value of the given point in a coordinate system having a lower boundary value of the predetermined linear boundaries as the origin of the coordinate system.

6. An area discriminating circuit claimed in claim 1 wherein said first detection means includes a first inversion means receiving said first number for generating a one's complement of said first number, and a first full addition and zero detection means receiving said one's complement of said first number as an added and said input number representing a coordinate value of the given point as an augend, and wherein said second detection means includes a second inversion means receiving said second number for generating a one's complement of said second number, and a second full addition and zero detection means receiving said one's complement of said second number as an addend and said input number representing a coordinate value of the given point as an augend, each of said first and second addition and zero detection means including:

- a plurality of full adders each of which has a first input connected to receive a corresponding bit of said augend, and a second input connected to receive a corresponding bit of said addend, a full adder for a LSB bit having a carry input connected to receive a binary value "1", each of the full adders excluding the full adder for a MSB bit having a carry output connected to a carry input of a next significant bit full adder, a sum output of the full adder for the MSB bit giving said first or fourth signal,
- an inverter connected to the sum output of the full adder for the MSB bit so that said inverter generates said third or sixth signal, and
- a NOR gate connected to receive the sum outputs of all the full adders for generating said second or fifth signal.

7. An area discriminating circuit claimed in claim 6 wherein said sum outputs of all the full adders of said first full addition and zero detection means give a first difference signal representing a difference between said first boundary value and said coordinate value of the given point, and said sum outputs of all the full adders of said second full addition and zero detection means give a second difference signal representing a difference between said second boundary value and said coordinate value of the given point, and further including:

- a first tristate buffer means receiving a first difference signal and controlled by said seventh signal so that said first difference signal is outputted from said first tristate buffer means when said coordinate value of the given point is not less than said first boundary value and is not greater than said second boundary value,
- a second tristate buffer means receiving a second difference signal and controlled by said eighth signal so that said second difference signal is outputted from said second tristate buffer means when said coordinate value of the given point is not less than said second boundary value and is not greater than said first boundary value, and
- an OR output means receiving an output of said first tristate buffer means and an output of said second tristate buffer means so as to generate an output signal indicating a coordinate value of the given point in a coordinate system having a lower boundary value of the predetermined linear boundaries as the origin of the coordinate system.

8. A circuit for discriminating whether or not a given point exists within predetermined linear boundaries, comprising:

first and second registers for storing first and second numbers representing boundary values defining the predetermined linear boundaries,
a first detection circuit receiving the first number from the first register and an input number representing a coordinate value of the given point,
a second detection circuit receiving the second number from the second register and said input number representing the coordinate value of the given point, each of the first and second detection circuits generating a first signal indicating that the boundary value is not greater than the coordinate value of the given point, a second signal indicating that the boundary value is equal to the coordinate value of the given point, and a third signal indicating that the boundary value is greater than the coordinate value of the given point, and
an output logic gate array receiving the first, second and third signals from each of the first and second detection circuits, and generating a discrimination signal indicating that the coordinate value of the given point is within the predetermined linear boundaries defined by the first boundary value and the second boundary value.

9. A circuit for discriminating whether or not a given point exists within a predetermined rectangular area, comprising:

first and second registers for storing first and second numbers representing boundary values of a first coordinate defining the predetermined rectangular area;
third and fourth registers for storing third and fourth numbers representing boundary values of a second coordinate defining the predetermined rectangular area;
first detection means receiving said first number from said first register and a first input number representing a first coordinate value of the given point for generating a first signal indicating that said first boundary value is not greater than said first coordinate value of the given point, a second signal indicating that said first boundary value is equal to said first coordinate value of the given point, and a third signal indicating that said first boundary value is greater than said first coordinate value of the given point;
second detection means receiving said second number from said second register and said first input number representing the first coordinate value of the given point for generating a fourth signal indicating that said second boundary value is not greater that said first coordinate value of the given point, a fifth signal indicating that said second boundary value is equal to said first coordinate value of the given point, and a sixth signal indicating that said second boundary value is greater than said first coordinate value of the given point;
first logic circuit means receiving said first, fifth and sixth signals for generating a seventh signal indicating that said first coordinate value of the given point is not less than said first boundary value and is not greater than said second boundary value;
second logic circuit means receiving said second, third and fourth signals for generating an eighth signal indicating that said first coordinate value of the given point is not less than said second boundary value and is not greater than said first boundary value;
first output means receiving said seventh and eighth signals for generating a first discrimination signal indicating that said first coordinate value of the given point within a predetermined linear area defined by said first boundary value and said second boundary value;
third detection means receiving said third number from said third register and a second input number representing a second coordinate value of the given point for generating a ninth signal indicating that said third boundary value is not greater than said second coordinate value of the given point, a tenth signal indicating that said third boundary value is equal to said second coordinate value of the given point, and an eleventh signal indicating that said third boundary value is greater than said second coordinate value of the given point;

fourth detection means receiving said fourth number from said fourth register and said second input number representing the second coordinate value of the given point, for generating a twelfth signal indicating that said fourth boundary value is not greater than said second coordinate value of the given point, a thirteenth signal indicating that said fourth boundary value is equal to said second coordinate value of the given point, and a fourteenth signal indicating that said fourth boundary value is greater than said second coordinate value of the given point;

third logic circuit means receiving said ninth, thirteenth and fourteenth signals for generating a fifteenth signal indicating that said second coordinate value of the given point is not less than said third boundary value and is not greater than said fourth boundary value;

fourth logic circuit means receiving said tenth, eleventh and twelfth signals for generating a sixteenth signal indicating that said second coordinate value of the given point is not less than said fourth boundary value and is not greater than said third boundary value;

second output means receiving said fifteenth and sixteenth signals for generating a second discrimination signal indicating that said second coordinate value of the given point is within a predetermined linear area defined by said third boundary value and said fourth boundary value; and fifth logic means receiving said first and second discrimination signals for generating a seventeenth signal indicating that said given point is within said predetermined rectangular area.

10. The area discriminating circuit claimed in claim 9 wherein said first detection means outputs a first difference signal between said first number and said first input number, and said second detection means outputs a second difference signal between said second and said first input number, and further including:

a first tristate buffer means receiving a first difference signal and controlled by said seventh signal so that said first difference signal is outputted from said first tristate buffer means when said first coordinate value of the given point is not less than said first boundary value and is not greater than said second boundary value, a second tristate buffer means receiving a second difference signal and controlled by said eighth signal so that said second difference signal is outputted from said second tristate buffer means when said coordinate value of the given point is not less than said second boundary value and is not greater than said first boundary value, and a first OR output means receiving an output of said first tristate buffer means and a first output of said second tristate buffer means so as to generate an output signal indicating a first coordinate value of the given point within the rectangular area, and wherein said third detection means outputs a third difference signal between said third number and said second input number, and said fourth detection means outputs a fourth difference signal between said fourth number and said first input number, and further including:

a third tristate buffer means receiving a third difference signal and controlled by said fifteenth signal so that said third difference signal is outputted from said third tristate buffer means when said second coordinate value of the given point is not less than said third boundary value and is not greater than said fourth boundary value, a fourth tristate buffer means receiving a fourth difference signal and controlled by said sixteenth signal so that said fourth difference signal is outputted from said fourth tristate buffer means when said second coordinate value of the given point is not less than said fourth boundary value and is not greater than said third boundary value, and a second OR output means receiving an output of said third tristate buffer means and an output of said fourth tristate buffer means so as to generate a second output signal indicating a second coordinate value of the given point within the rectangular area.

11. The area discriminating circuit claimed in claim 10 further comprising:

fifth tristate buffer means receiving said first output from said first OR output means, and sixth tristate buffer means receiving said second output from said second OR output means, said seventeenth signal controlling said fifth and sixth tristate buffer means to output said first and second outputs when said seventeenth signal indicates that said given point is within said predetermined rectangular area.

12. The area discriminating circuit claimed in claim 10 further comprising:

fifth tristate buffer means receiving said first output from said first OR output means, sixth tristate buffer means receiving said second output from said second OR output means, and priority order decision means responsive to a plurality of signals corresponding to said seventeenth signal from a plurality of area discriminating circuits for generating a selection signal for controlling said fifth and sixth tristate buffer means to output said first and second outputs when said seventeenth signal indicates that said given point is within said predetermined rectangular area.

* * * * *